United States Patent
Szafranski et al.

(10) Patent No.: US 11,595,381 B2
(45) Date of Patent: Feb. 28, 2023

(54) SECURE AUTHORIZATION FOR ACCESS TO PRIVATE DATA IN VIRTUAL REALITY

(71) Applicant: Visa International Service Association, San Francisco, CA (US)

(72) Inventors: Christopher Szafranski, Foster City, CA (US); Lance Weber, Longmont, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 446 days.

(21) Appl. No.: 16/627,206

(22) PCT Filed: Aug. 23, 2017

(86) PCT No.: PCT/US2017/048283
§ 371 (c)(1),
(2) Date: Dec. 27, 2019

(87) PCT Pub. No.: WO2019/040065
PCT Pub. Date: Feb. 28, 2019

(65) Prior Publication Data
US 2020/0228524 A1    Jul. 16, 2020

(51) Int. Cl.
*H04L 29/06* (2006.01)
*H04L 9/40* (2022.01)
(Continued)

(52) U.S. Cl.
CPC .......... *H04L 63/0861* (2013.01); *G06F 21/32* (2013.01); *H04L 63/0435* (2013.01); *H04L 67/131* (2022.05)

(58) Field of Classification Search
None
See application file for complete search history.

(56) References Cited

U.S. PATENT DOCUMENTS 6,766,454 B1 *  7/2004  Riggins ............... H04L 63/0838
                                                               713/185
9,443,263 B1 *  9/2016  Kim .................. G06Q 30/0241
                (Continued)

FOREIGN PATENT DOCUMENTS

CN    106997239      8/2017
KR    1020170034618  3/2017
WO    2006128171     11/2006

OTHER PUBLICATIONS

Carol A. Siegel, "Windows NT Server Operating System Security Feature", Handbook of Heterogeneous Networking 1999, ISBN: 9781351072625, p. 59-1, 1999, (Year: 1999).*

(Continued)

*Primary Examiner* — Piotr Poltorak
(74) *Attorney, Agent, or Firm* — Kilpatrick Townsend & Stockton LLP

(57) ABSTRACT

Techniques for secure authentication in virtual reality are provided. A virtual reality application executing on a virtual reality device can provide virtual reality environment. The virtual reality application may communicate with a server that provides a plurality of objects for display in the VR environment. The environment can include an object that, once selected, may initiate an authentication process. Once initiated, an authentication application may be launched on the VR device, so that a private authentication environment may be provided to the user. The user may be prompted to provide a biometric sample using one or more input devices coupled to the VR device. The biometric sample can then be sent to the authentication server, so that an authentication result may be determined from a comparison of the sample to a biometric template established during registration.

17 Claims, 9 Drawing Sheets

(51) Int. Cl.
    *G06F 21/32*     (2013.01)
    *H04L 67/131*    (2022.01)

(56)            References Cited

U.S. PATENT DOCUMENTS

| | | | |
|---|---|---|---|
| 10,803,441 B1* | 10/2020 | White | G06Q 20/3226 |
| 2006/0106605 A1* | 5/2006 | Saunders | G10L 17/04 |
| | | | 704/E17.006 |
| 2007/0061590 A1 | 3/2007 | Boye et al. | |
| 2009/0106347 A1 | 4/2009 | Harwood et al. | |
| 2009/0138402 A1 | 5/2009 | Chan et al. | |
| 2010/0138755 A1 | 6/2010 | Kulkarni et al. | |
| 2013/0312086 A1 | 11/2013 | Hamilton, II et al. | |
| 2015/0089240 A1* | 3/2015 | Itkis | H04L 63/0861 |
| | | | 713/186 |
| 2015/0310194 A1* | 10/2015 | Zhang | G06F 21/31 |
| | | | 726/9 |
| 2018/0039341 A1* | 2/2018 | Du Bois | G06F 3/017 |
| 2018/0107814 A1* | 4/2018 | Wu | G06F 21/62 |
| 2018/0150690 A1* | 5/2018 | Yin | A61B 3/0008 |

OTHER PUBLICATIONS

Windows NT (as illustrated by Carol A. Siegel, "Windows NT Server Operating System Security Feature", Handbook of Heterogeneous Networking 1999, ISBN: 9781351072625, p. 59-1, 1999) (Year: 1999).*
PCT/US2017/048283 , "International Search Report and Written Opinion", dated May 17, 2018, 13 pages.
EP17922402.7 , "Extended European Search Report", Jun. 15, 2020, 11 pages.

\* cited by examiner

SECURE AUTHORIZATION FOR ACCESS TO PRIVATE DATA IN VIRTUAL REALITY This application is a 35 U.S.C. 371 patent application of PCT Application No. PCT/US2017/048283, filed on Aug. 23, 2017, which is herein incorporated by reference in its entirety.

BACKGROUND

In today's technological environment, a user can use a virtual reality (VR) device to interact with various 3D objects. Such an interaction may occur in a multi-user environment or otherwise involve network communications. In some instances, a 3D object may serve as a virtual representation of an object in the real world, and the user may want to access private data associated with the 3D object via an authentication process. However, performing an authentication process in virtual reality can be difficult as there are limited input mechanisms (e.g., no keyboard). Further, the authentication process should occur in a manner that does not expose the user's authentication credentials, particularly in a multi-user VR environment. Additionally, other users should not interfere with the authentication process, and vice versa.

Embodiments of the invention address this and other problems, individually and collectively.

BRIEF SUMMARY

Systems and methods for securely authenticating a user in virtual reality are described herein. A virtual reality (VR) device can be used to simulate a real environment or "scene" for a user. The virtual reality device may present to the user images, sounds, and other stimuli that can be perceived as real or close to reality. This may include providing an environment that can react to the user's actions (i.e. inputs) via sensors. For example, image data for an environment may be displayed to the user, and the images may change as the user moves his or her head as if observing a real environment. As another example, the user may be shown virtual objects, which may react to sensed movements by the user as if he or she is affecting real objects around him or her. In addition, the simulated environment, can also be a multi-user environment, wherein a plurality of users can interact with objects simultaneously and with each other.

In some instances, the virtual reality experience may involve accessing private data by the user. For example, the VR experience may involve accessing a protected virtual home or account records, e.g., in a virtual office, or accessing secret data about a player in an online multi-user game. Thus, the user may wish to access private records in the virtual reality environment, or view other content that requires identification. As such, a secure authentication process in virtual reality may be required, as described herein.

Embodiments of the invention can provide a method for secure authentication in virtual reality. The method may comprise launching a virtual reality environment provided by a virtual reality application executing on a virtual reality device. The virtual reality application may comprise a user identifier for the user of the VR device, which can be established during a registration process. The virtual reality application may communicate with a server that provides a plurality of objects for display in the VR environment. The plurality of objects may be selectable by the user using one or more input devices, such that the virtual reality device may receive the object selections and associated object data. Selected objects may include a resource that the user wishes to access, and the objects may be associated with object data. The environment can also include an object that, once selected, may initiate an authentication process. Once initiated, an authentication application may be launched on the VR device, so that a private authentication environment may be provided to the user.

Information relating to a registered biometric template of the user can be retrieved by an authentication server using a user identifier stored on the VR device. This can include specific instructions that the user may be required to perform in order to be successfully authenticated. The user may be prompted to provide a biometric sample using one or more input devices coupled to the VR device. In one embodiment, the biometric sample may be a voice sample of the user. For example, the user may be prompted to speak and record a registered phrase from which the user's unique voice characteristics can be extracted. The biometric sample can then be sent to the authentication server, so that an authentication result may be determined from a comparison of the sample to a biometric template established during registration. For example, a recording of the user speaking the registered phrase may be analyzed, and may be compared to a voice signature generated from a previous recording of the user's voice recorded during registration into the authentication program. After the comparison has been performed, an authentication result can then be sent to the VR device so that the user may be allowed or denied access to the private data.

These and other embodiments of the invention are described in detail below. For example, other embodiments are directed to systems, devices, and computer readable media associated with methods described herein.

These and other embodiments of the invention are described in further detail below.

DETAILED DESCRIPTION

Described below are systems and processes for enrollment and implementation of the secure authentication method briefly mentioned above. A user can use a virtual reality (VR) device to interact with various 3D objects. The user may want to access private data associated with the 3D object via an authentication process. Performing an authentication process in virtual reality can be difficult due to limited input mechanisms, and due to the nature of how authentication credentials can be presented, particularly in a multi-user VR environment.

In some embodiments, a virtual reality environment can be provided by a virtual reality application executing on a virtual reality device. The environment can also include an object that can initiate an authentication process. Once initiated, a private authentication environment can be launched and provided to the user via the VR device. The user may be prompted to provide a biometric sample using one or more input devices coupled to the VR device. For example, the user may be prompted to speak and record a registered phrase from which the user's unique voice characteristics can be extracted. A recording of the user speaking the registered phrase may be analyzed, and may be compared to a voice signature generated from a previous recording of the user's voice recorded during registration into the authentication program. After the comparison has been performed, an authentication result can then be sent to the VR device so that the user may be allowed or denied access to the private data.

I. System for Authentication of VR User

Figure 1:
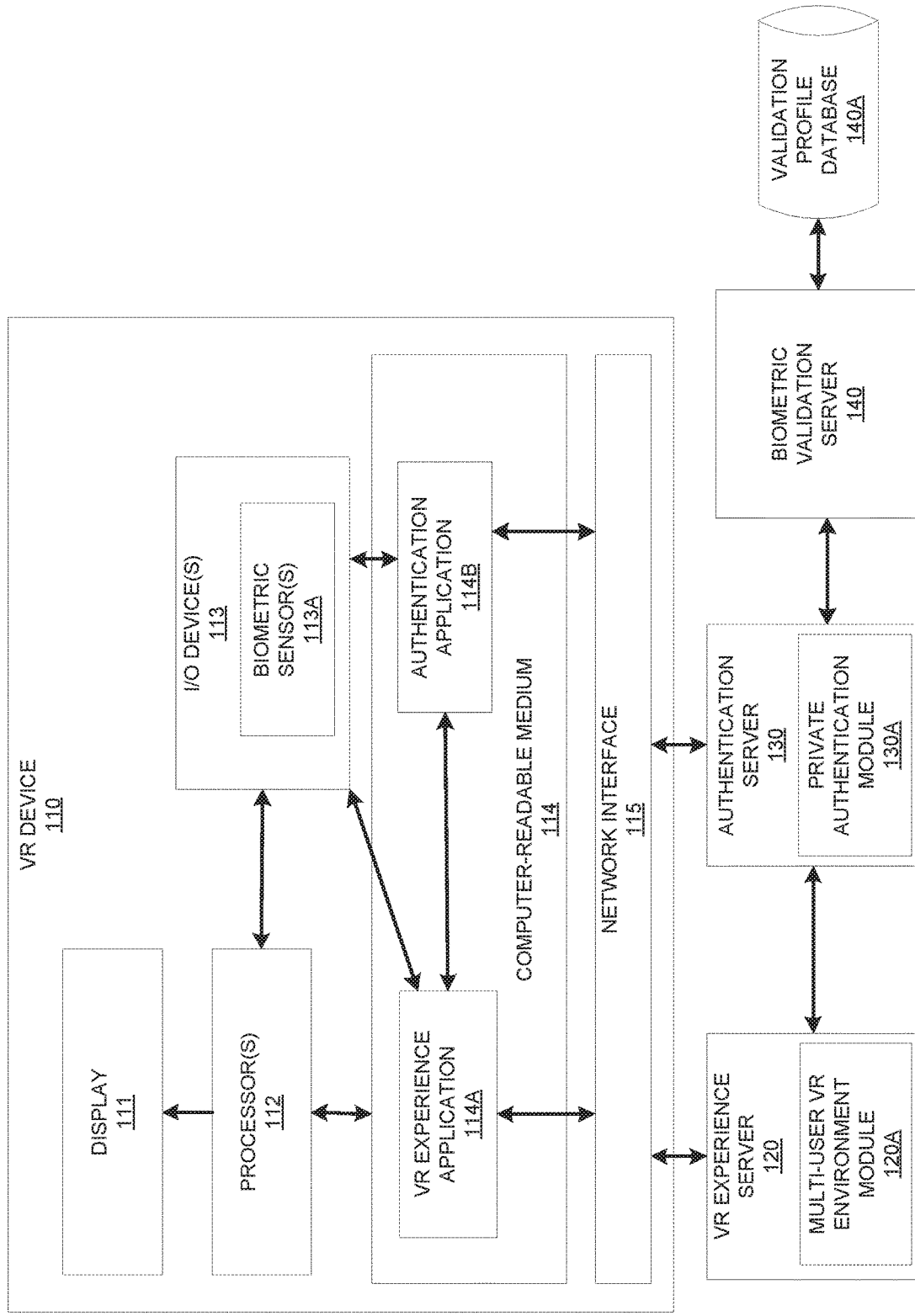
FIG. 1 shows a block diagram of a system for authenticating a user immersed in virtual reality according to embodiments.

FIG. 1 shows a block diagram of a system for authenticating a user immersed in virtual reality according to embodiments. An exemplary system including a virtual reality (VR) device 110, a VR experience server 120, an authentication server 130, a biometric validation server 140, and a validation profile database 140A is described.

According to embodiments. VR device 110 may be a device for immersing a user in virtual reality. The VR device 110 can be any computing device capable of providing, to a user of the device, a virtual environment that mimics the sensory experiences of a real environment. For example, the VR device 110 may be a mobile device that can display a 3-dimensional field of view that is reactive to a user's head movements (e.g., via sensors, such as accelerometer(s) and gyrometer(s), in the device and/or headgear), such as a mobile phone fitted with a virtual reality headset (e.g. Samsung Gear VR™). As other examples, the VR device 110 can be a gaming console, personal computer, flight simulator, or any other machine that may simulate real-world sensory inputs in response to corresponding real-world actions by a user.

In embodiments, the VR device 110 may comprise or be coupled to a display 111 for displaying a virtual environment to a user. For example, the display can be a screen of a mobile phone or can be one or more LCD or plasma screen displays that can be connected to the VR device and that are within the field of view of the user. The display 111 may be coupled to one or more processor(s) 112, which can include one or more graphics processing units for processing image data for display on display 111. The one or more processor(s) may further comprise a central processing unit (CPU) for executing instructions of computer-readable medium 114. Computer-readable medium 114 may be a memory storage for storing executable instructions, such as processing instructions in the form of computer-readable code. In addition, VR device 110 may comprise a network interface 115 for communicating over a suitable communications network. For example, the network interface may be an antenna or wired connection for enabling internet access, such as through mobile wireless broadband, WiFi. Ethernet, fiber optics, laser relay, etc. Although communication from network interface 115 is shown going through computer-readable medium 114, such communication can occur on a communications bus that may be distributed throughout other components of VR device 110, such as processor(s) 112.

VR device 110 may further comprise one or more input/output (10) device(s) 113. I/O device(s) 113 may be any device included as part of, or coupled to, the VR device 110, and that a user can use to interact with a virtual reality environment of the VR device 110. This may include, push buttons, cameras, microphones, accelerometers, gyroscopes, magnetometers, etc. In embodiments, the I/O device(s) 113 may further include one or more biometric sensor(s) 113A for sensing, capturing, and recording a biometric sample of the user. For example, biometric sensor(s) 113A may be a microphone for recording a user's voice, a retinal scanner or iris scanner for scanning features of a user's eyes, a fingerprint reader, vein scanner, or any other device for identifying unique features of a particular human being operating the VR device 110.

In embodiments, a VR environment may be provided by one or more applications stored in computer-readable medium 114. This may include VR experience application 114A. Examples of VR experience application 114A may include gaming applications or any other digital media applications that can be used for entertainment, such as movie/television applications, music applications, digital news applications, etc. Other examples of VR experience application 114A may include applications for simulating real-world tasks for training, education, or for performing the real-world tasks remotely. For example, VR experience application 114A may be an application for shopping, viewing property or landscapes, accessing records, performing operations, attending a course, etc.

In embodiments. VR experience application 114A may be in communication with a VR experience server 120 through network interface 115. The VR experience server 120 may be a remote server that provides back-end support for VR experience application 114A. For example, VR experience server 120 may be a centralized server or group of servers that may modify a VR environment of VR experience application 114A, such as by adding, removing, and modifying virtual objects and object data thereof. In one embodiment, the VR experience server 120 may allow a plurality of users to access a multi-user environment in which the plurality of users may interact with one another. For example, VR experience server 120 may modify the VR environment based on commands from multiple VR devices and users thereof. VR experience server may comprise multi-user VR environment module 120A, which may be a module of VR experience server 120 that may send and receive audio and video data to VR device 110 and to other VR devices of other users. The multi-user VR environment module 120A may generate and/or modify audio and video data based on commands from users, such that the multi-user VR environment on each VR device may appear to be a single environment. For example, multi-user VR environment module 120A may receive data for audio spoken by a user of VR device 110 and may then play back the audio to another user in the multi-user VR environment, such that the users may have a shared experience.

Computer-readable 114 may further comprise an authentication application 114B for performing a secure authentication process. In embodiments, authentication application 114B may be an application that allows a user of VR device 110 to verify his or her identity to a third party. For example, authentication application 114B may be a biometric verification application, mobile banking application, digital wallet application, payment processing application, or any other application that may store a user's credentials.

In one embodiment, authentication application 114B may be in communication with an authentication server 130 through network interface 115. The authentication server 130 may be a remote server that provides back-end support for authentication application 114B. For example, authentication application 114B may provide a private authentication environment in which a secure authentication process can be performed through messages sent to and from authentication server 130. The authentication server 130 may further transmit commands to add, remove, and/or modify objects and object data in the private authentication environment. Authentication server 130 may comprise private authentication module 130A, which may be a module of authentication server 130 that may send and receive data in an authentication process, such as audio data recorded by VR device 110 or data for objects. In one embodiment, authentication server 130 may be in communication with VR experience server 120 as part of the authentication process. In one embodiment, authentication application 114B may be a part of VR experience application. For example, authentication application 114B may be a plug-in that provides code for a private authentication environment as well as for necessary API calls for communicating with authentication server 130. In one embodiment, authentication server 130 and VR experience server 120 may be the same server.

In one embodiment, authentication server 130 may carry out an authentication process through communications with a biometric validation server 140. Biometric validation server 140 may be a remote server that may compare a biometric sample captured on VR device 110 and compare the biometric sample to a biometric template stored in validation profile database 140A. For example, validation profile database 140A may comprise a first biometric template recorded by the user of VR device 110 during a registration process, and may then generate a second biometric template from a biometric sample recorded by the user during an authentication process. The biometric templates can be voice signatures, facial profiles, fingerprint profiles, or any other digital file representing features of a user's biometric. The biometric validation server may then compare the first and second biometric templates to determine an authentication result (e.g. match or no match). In one embodiment, authentication server 130 and biometric validation server 140 may be the same server.

II. Registration of Biometric Template

Figure 2:
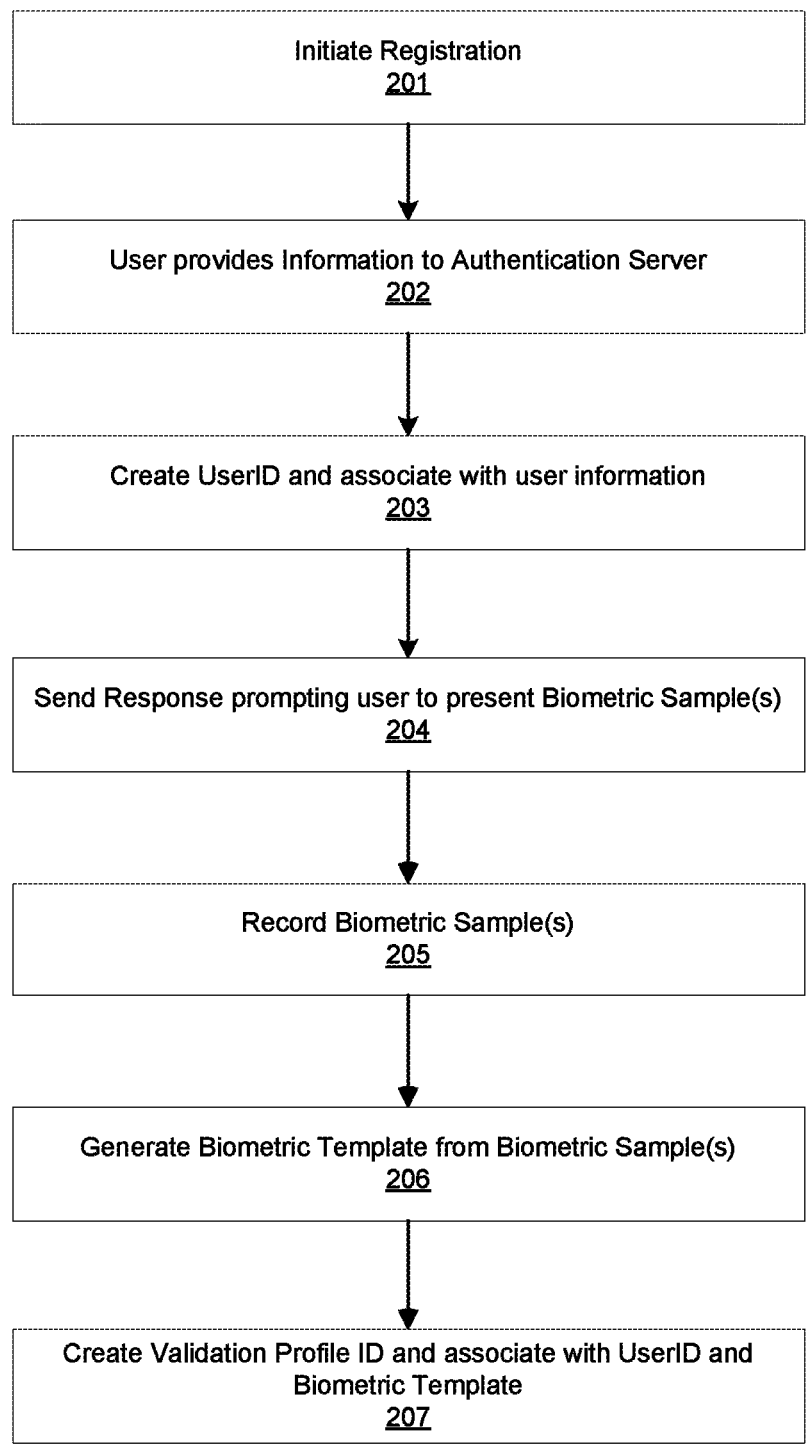
FIG. 2 shows a flowchart for a process of registering a biometric template according to an embodiment.

FIG. 2 shows a flowchart for a process of registering a biometric template according to an embodiment. For enrollment into an authentication program that can be used to authenticate the user at a later point in time, the user's biometric template may be registered and associated with user as further described below.

At step 201, the user of a virtual reality device initiates a registration process. The registration process may be initiated by contacting an authentication server (e.g., authentication server 130 of FIG. 1). In one embodiment, the registration process may be initiated from the virtual reality device. For example, the virtual reality device may be a mobile phone, and the registration process may be initiated from an authentication application (e.g., authentication application 114B of FIG. 1) or website provided by an authentication provider. In one embodiment, the registration can occur at time of installation of the authentication application. As another example, the authentication server may be contacted through a virtual reality experience application, such as VR experience application 114A of FIG. 1. The virtual reality experience application may provide an option to initiate the registration process, which may generate an API call to the authentication server or may direct the user to a web application of the authentication provider or to an authentication application stored on the virtual reality device.

At step 202, the user provides user information to the authentication server. The user information may comprise the user's name, email address, and other user account credentials, such as a chosen username and password. The user information may be provided to the authentication server by manually entering the information into a form provided by the authentication application or website that a user is conducting the registration at. The user may further be asked to provide his or her payment credentials. For example, the user can manually enter payment card information or bank account information or can scan his or her payment device. As another example, the user may allow an authentication application to access payment credentials from another application on the virtual reality device, such as from a digital wallet application or mobile banking application.

At step 203, a user identifier is created and associated with the entered user information by the authentication server. For example, the authentication server may generate the user identifier as a random string of characters (e.g. 'UserID=5988037401374askdfj02.'). The authentication server may link the user identifier to the user information in a relational database (e.g., validation profile database 140A of FIG. 1). In one embodiment, the user information may be stored in the relational database in encrypted form or as a hash. In another embodiment, the user identifier may be a hash of the user information.

At step 204, a response is sent from the authentication server, prompting the user to present his or her biometric sample(s). The response may comprise the user identifier created by the authentication server and information relating to a biometric template that is to be registered. The information relating to the biometric template may comprise instructions for the user to record his or her biometric sample. As examples, the user may be prompted to take a picture of his or her face and/or speak a particular phrase (e.g. 'you can get in without your password').

At step 205, the user's biometric sample(s) is recorded. Upon being prompted by the authentication server, the user may record his or her biometric sample. In one embodiment, the biometric sample may comprise samples of the user's voice. For example, the user may be prompted to repeatedly speak a particular phrase that can be associated with the user. A recording of the user speaking the phrase may be sent to a biometric validation server. For example, an API call comprising user voice data may be sent to a remote server along with the user identifier. The remote server may be, for example, biometric validation server 140 of FIG. 1. In one embodiment, the biometric validation server and the authentication server may be the same server or may be of the same entity.

At step 206, a biometric template is generated from the recorded biometric sample(s). Unique features may be extracted from the biometric sample(s) of the user by the biometric validation server to generate the biometric template. For example, a pattern recognition algorithm can be used to identify patterns in the intonation, accent, tempo, and pronunciation of characters of the particular phrase spoken by the user. The patterns may be derived by isolating different frequency bands of an audio file and analyzing the time intervals for which the isolated frequency bands exist. The identified patterns may further be scored over time so as to improve the accuracy of speech recognition, such as through a training process as in the case of machine learning. The patterns may then be used to generate a digital file that is unique to the user and that cannot be replicated by another individual that attempts to mimic the user. The digital file may be used as the registered biometric template for the user, which can be compared to a biometric data presented at a later time to determine a match. For example, a user can record a voice sample during an authentication process, and the voice sample may be analyzed to determine a level of probability that the voice sample belongs to the user associated with the registered template. More information regarding voice and speech recognition may can be found in U.S. Pat. Nos. 4,752,958 and 9,218,807, which are herein incorporated by reference in their entirety for all purposes. It should be understood that in other examples, digital files comprising unique features of the user's fingerprint, face, iris, retina, etc. can also be used as the registered biometric template.

At step 207, a validation profile identifier is created and is associated with the generated biometric template and with the user identifier. The validation profile and the biometric template may be stored in a database (e.g. validation profile database 140A of FIG. 1) and may be linked to one another in the database (e.g. in a relational table). The validation profile identifier may then be returned to the authentication server along with the user identifier and information relating to the biometric template. For example, a biometric validation server may send the authentication server a particular phrase spoken by the user during registration so that the authentication server may prompt the user to repeat the phrase during an authentication process at a later point in time. The authentication server may associate the validation profile identifier with the user identifier, such as by storing and linking the identifiers in a database. In one embodiment, the biometric validation server may be the authentication server, and the user identifier may be linked directly to the registered biometric template (i.e. the user identifier may server as the validation profile identifier).

III. Method for Conducting Secure Authentication in VR

Figure 3:
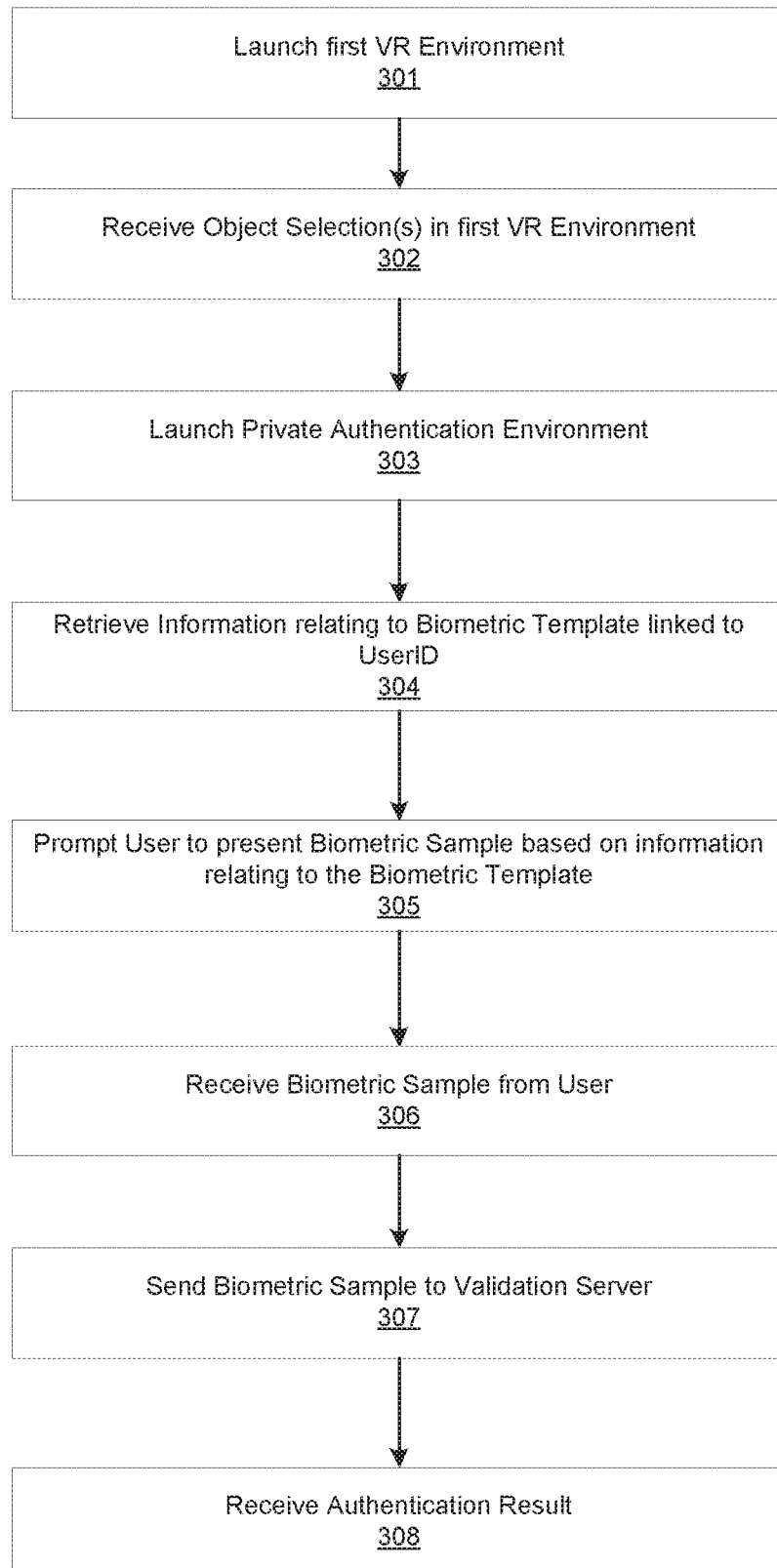
FIG. 3 shows a flowchart of a method according to embodiments.

FIG. 3 shows a flowchart of a method according to embodiments. The method shown is directed to performing a secure authentication process on a virtual reality device. In one embodiment, the virtual reality device may be VR device 110 of FIG. 1.

At step 301, a first VR environment is launched using the virtual reality (VR) device. The multi-user VR environment may be provided by a VR experience application stored on the device. In one embodiment, the VR experience application may be VR experience application 114A of FIG. 1. In one embodiment, the VR experience application may store or have access to a user identifier associated with a registered authentication program, such as described in the previous section above. For example, the user identifier may be associated with a VR account of the user and the VR experience application may store a pointer as to the location of the user identifier in local memory of the VR device. The first VR environment can be a multi-user VR environment, and may comprise a plurality of users of a plurality of VR devices, and data may be passed between the users by connecting their devices over a network, such as through one or more servers. The transfer of data between users may be facilitated by a VR experience server (e.g. VR experience server 120 of FIG. 1) that provides a plurality of first objects to the VR experience application.

At step 302, an object selection(s) is received in the first VR environment. In embodiments, virtual objects may be presented to the user, which may represent objects in the real world. Each of the virtual objects may comprise object data, which may include information about the virtual objects or about real objects that they represent. For example, the first VR environment may be a training simulation or a virtual classroom, and the virtual objects may be virtual representations of real-life obstacles or of a real-life performance examination that a user may need to take. In another example, the first VR environment may be a virtual shopping experience, and the virtual objects may be virtual representations of real products that a user may purchase. In other examples, the first VR environment can be a virtual representation of a property viewing, medical examination, business meeting, bank interaction, etc.

As the user is being presented with virtual objects, the user may select the objects using an input device of the VR device. For example, the VR device may display a pointer that may be used to select objects by moving the pointer directly in front of the object and pressing a push button coupled to the VR device. The command from the push button and the position of the pointer may be communicated to the VR experience application, signaling to the application that the object has been selected by the user. The pointer can further be timer based, such that if the user keeps an object within a center portion of his or her field of view, the object may be automatically selected. For example, the pointer may be a "gaze pointer," wherein if a user looks or "gazes" at an object for longer than 3 seconds, then the VR device may interpret the gaze as an input and may signal to the VR experience application that the object has been selected by the user. Other examples of input devices that can be used for selecting the object may include microphones for receiving voice commands from the user and/or motions sensors that can sense actions by the user, such as actions that can be identified as the user grabbing an object in his or her field of view.

Object data for the selected object(s) may be recorded by the VR experience application and may be associated with the user. In one embodiment, the object data may be associated with the user by linking a user identifier to the object data. For example, the VR experience application may store a user ID for a registered authentication program. The VR experience application may comprise an array or other data storage elements, wherein the user ID can be associated with object data and/or pointers thereof, allowing the VR experience application to take note of the user selection(s).

In one embodiment, the selection of one or more objects by the user in the first VR environment may trigger the launching of the private authentication environment. The trigger may be a function that is linked to an object or data thereof, and may be automatically executed by a processor of the VR device upon selection of the object by the user. For example, the first VR environment may present a doorway object that a user may select by passing through the doorway object in the VR environment. The selection of the doorway object may then trigger a function to launch the private authentication environment so that the user can authenticate his or herself, such as to prove enrollment into an educational course or to access private records for conducting a medical examination, bank transaction, business deal, legal agreement, etc. As another example, a "checkout" object for accessing object(s) selected in a virtual store or for accessing real representations thereof may be included in the environment, and when selected by the user the "checkout" object may signal to the VR experience application that the user wishes to conduct a transaction that requires an authentication process. As with any other object in the multi-user VR environment, the user may select the "checkout" object using one or more input/output devices of the VR device (e.g. using a pointer and pushbutton, speaking a voice command, performing a sensible motion, etc.).

At step 303, the private authentication environment is launched. The private authentication environment may be provided by an authentication application stored on the VR device, such as authentication application 114B of FIG. 1. In one embodiment, the private authentication environment may be launched in response to a communication from the first environment server as a result of the selection of a first object. The response may be the result of a function associated with the object. For example, a "begin session" object or "checkout" object provided by the first environment server can include instructional metadata (e.g., a deep link, script, etc.) that is processed upon selection and directs the VR device to launch authentication application 114B. The function that launches the private authentication environment may further be associated with additional functions that may relate to an authentication session, such as functions for sending additional data about the user in the first environment to the private authentication environment (e.g. a game status or logo that can be displayed to the user in the private authentication environment). As previously explained, the authentication application may communicate with a remote authentication server (e.g. authentication server 130 of FIG. 1), allowing for the sending and receiving of data necessary for carrying out an authentication process in the environment. The transfer of data in the private authentication environment may be facilitated by one or more modules of the authentication server, such as private authentication module 130A of FIG. 1.

In one embodiment, a user identifier stored in a memory of the VR device may be retrieved by the authentication application providing the private authentication environment. For example, a pointer as to the location of the user identifier may be passed from the first VR environment to the private authentication environment. The authentication application may obtain the user identifier so as to associate the authentication session with the user and obtain the user's information submitted during registration into the authentication program. The user identifier may be sent to and received by the authentication server capable of retrieving the user's information and his or her registered biometric template. In another embodiment, a link may be provided by a VR experience server that may allow the user to establish an authentication session with the authentication server. The link can specify a network address of the authentication server, which can be used by the authentication application to communicate with a particular authentication server. Upon establishment of the authentication session, the authentication server may load objects and/or object data thereof into the private authentication environment, which can be displayed to the user during authentication.

The private authentication environment may include second objects different from the first objects. For example, the first VR environment may comprise objects in a store, while the private authentication environment may comprise objects for an online checkout form. In embodiments, the user (and inputs thereof) is separated out of the first VR environment and transferred to the private authentication environment. In one embodiment, a first state for the user in the first VR environment may be recorded such that the user may re-enter based on the first state after authentication has been performed. For example, the first state may be a position of the user in a multi-user game, and the user may re-enter at the same position after an authentication session in the private authentication environment has ended. The private authentication environment can also include objects from or relating to the first VR environment and/or objects selected therein, such as a logo representing the first VR environment or product information for objects selected in the first VR environment.

At step 304, information relating to a registered biometric template linked to the user identifier of the user is retrieved. The information relating to the registered biometric template may comprise instructions for capturing the biometric sample from the user. For example, an authentication server of the authentication application may query a database for authentication instructions associated with the user identifier of the user. The authentication server may determine that the user identifier is associated with a registered biometric template of the user's voice. The authentication server may further determine that the biometric template of the user's voice is associated with instructing the user to speak a particular phrase (e.g. 'you can get in without your password'). In other examples, the authentication server can provide instructions to the VR device to record a fingerprint or retinal scan.

At step 305, the user is prompted to present his or her biometric sample based on information relating to the biometric template. In one embodiment, the biometric sample may be a sample(s) of the user's voice. For example, the user may be asked to repeat a particular phrase that was spoken during a registration process, as explained in sections above. Information regarding the particular phrase and instructions for repeating the phrase may be received by the virtual reality device from the authentication server and displayed to the user.

At step 306, the biometric sample is received from the user. In one embodiment, data for the biometric sample may be stored in a memory of the virtual reality device. For example, an audio file may be saved on the VR device. In one embodiment, the user may use an input/output device of the VR device to record his or her biometric sample. For example, the user may use a microphone of the VR device to repeat a particular phrase, which may then be recorded by the VR device and stored in memory.

At step 307, the biometric sample is sent to a biometric validation server. The biometric validation server may be a server that has access to a registered biometric template of the user. In one embodiment, the biometric sample may be forwarded to the biometric validation server by the authentication server. In one embodiment, the biometric validation server and authentication server may be the same server. The authentication server may receive the user identifier of the user, and may determine a validation profile identifier associated with the user identifier by referencing a look-up table. The authentication server may then send the biometric sample and the validation profile identifier to the biometric validation server so that the biometric validation server can query a validation profile database for a biometric template linked to the validation profile identifier. The biometric validation server can further include software for analyzing the biometric sample to obtain a biometric template that is compared to the biometric template stored in the validation profile database.

At step 308, the authentication result is received by the virtual reality device. The authentication result may be determined by the biometric validation server based on a comparison of the recorded biometric sample(s) of the user to a registered biometric template linked to the received validation profile identifier. For example, the validation server may determine the unique features of a received voice recording of the user speaking a registered phrase, and may compare them to a stored biometric template registered to the validation profile of the user.

Based on the authentication result, the virtual reality device may grant access to private data to the user. For example, upon receiving a positive authentication result (biometrics match) the VR device may conduct a transaction on behalf of the user using private payment credentials or a token thereof. For example, payment card information or payment token information stored on the VR device may be retrieved from a digital wallet application or from a secure element of the VR device. As another example, the payment card information can be retrieved from the authentication server, such as in the case of the authentication server being of a bank or transaction processor. In yet another example, private data associated with objects in the first VR environment can be unlocked. For example, the first VR application may request private information or digital content from the first VR environment server.

In one embodiment, a unique session identifier for the authentication session may be received from the authentication server by the virtual reality device, and may be forwarded to the first VR environment server. The unique session identifier can be used by the VR environment server to reference the authentication session and confirm authorization of access to the private data. For example, a record may of the authentication session stored in a database can be queried, which may comprise the object data for objects selected (e.g. product information) and the authentication result (e.g. match or no match, number of attempts, etc.).

IV. Environments

Described below are illustrations of example environments in VR This can include a first VR environment, or a main VR experience environment, in which a user may interact with objects, such as in the case of a game or training simulation. This can further include a private authentication environment that is separate from, and contains different objects from, the first VR environment. In embodiments, the first VR environment can be a multi-user VR environment, although aspects can be applicable to a single-user environment.

A. Multi-User VR Environment

Figure 4:
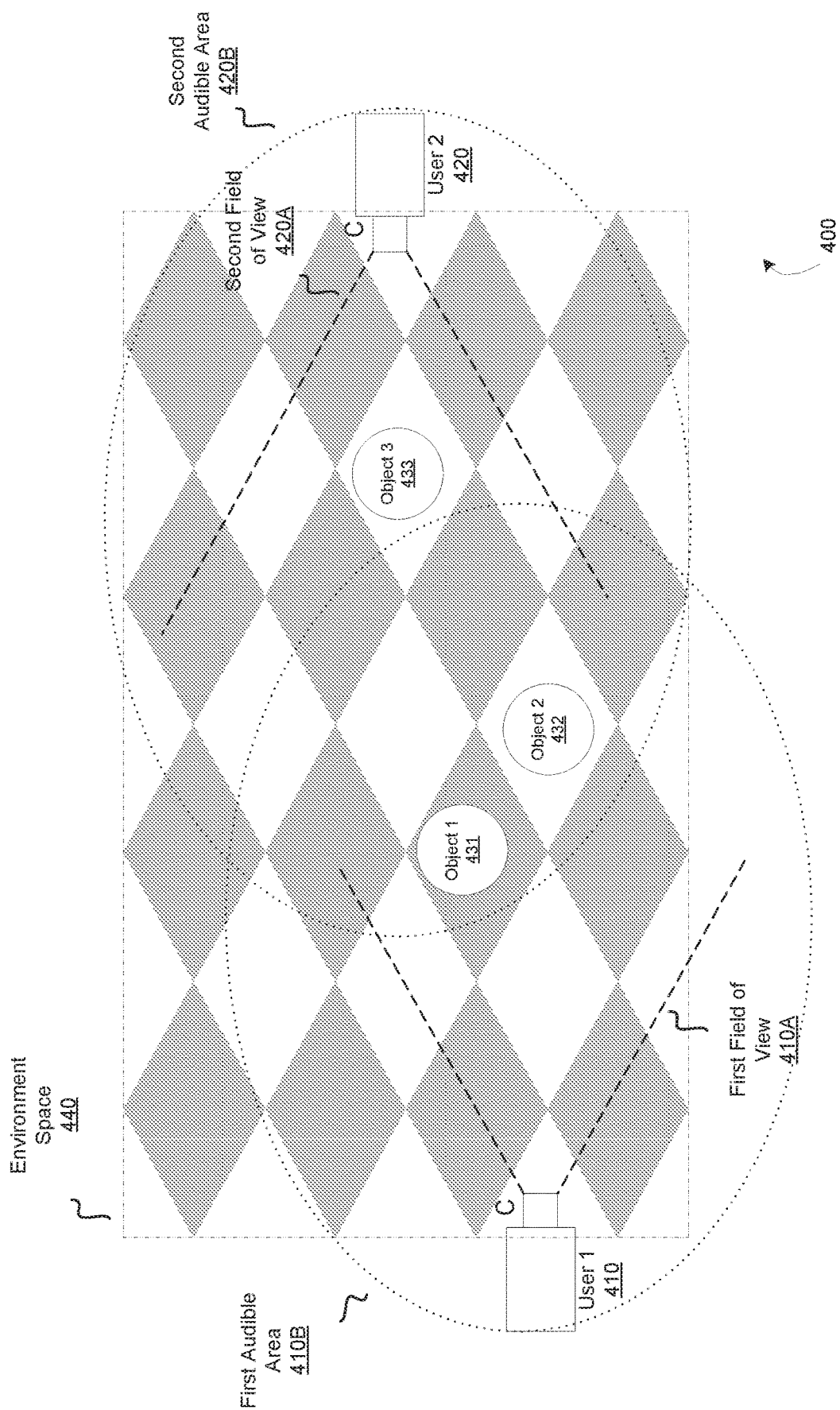
FIG. 4 shows an illustration of a multi-user VR environment according to an embodiment.

FIG. 4 shows an illustration of a multi-user VR environment according to an embodiment. Multi-user VR environment 400 may comprise audio data and image data that can be presented to a user and that may react to a user per one or more input/output devices of a VR device. The audio and image data may exist in environment space 440. Environment space 440 can be a 3-dimensional spatial grid, to which data in the environment can be assigned a position. Multi-user VR environment 400) may further comprise a plurality of users, such as user-1 410 and user-2 420. User-1 410 and user-2 420 may be associated with first field of view 410A and second field of view 420B respectively. Each field of view may be indicative of what a particular user in multi-user VR environment 400 is seeing at a given point in time, as provided by a display of a VR device. Each field of view may further change in reaction to user commands transmitted through input/output device(s) of his or her VR device. For example, in the case of a VR headset, the field of view may change according to the movement of the user's head as picked up by a sensor (e.g. an accelerometer of the VR device).

User-1 410 and user-2 420 may further be associated with first audible area 410B and second audible area 420B respectively. Each audible area may be indicative of an area over which audio data can be sent from and received by a particular user. Audio data generated by User-1 410 can potentially exist anywhere within the first audible data, and audio data generated by user-2 420 can potentially exist anywhere within the second audible area 420. Thus, if first audible area 410B intersects second audible area 420B, then user-1 410 may potentially hear audio spoken by user-2 420 and vice versa. This may be further depend on the amplitude of the audio data. For example, higher amplitude i.e. louder sounds may be translate to a larger portion of a given audible area. Audio data and its presence in the environment space 440 relative to first audible area 410B and second audible area 420B may be interpreted by a server hosting the environment, so that the server can determine if it should playback the audio to a VR device of user-1 410 and/or user-2 420.

User-1 410 and user-2 420 may be capable of selecting one or more objects located in the environment space 440, such as object 1 431, object 2 432, and object 3 433. As previously explained, this can be done using an I/O device of the VR device. For example, user-1 410 may select object-1 431 by placing the object in first field of view 410A and pressing a pushbutton, speaking a voice command, or performing a sensible motion, such as a grabbing or swiping motion. In embodiments, the environment space 440 may include an object that when selected may initiate the launch of a private authentication environment.

B. Private Authentication Environment

Figure 5:
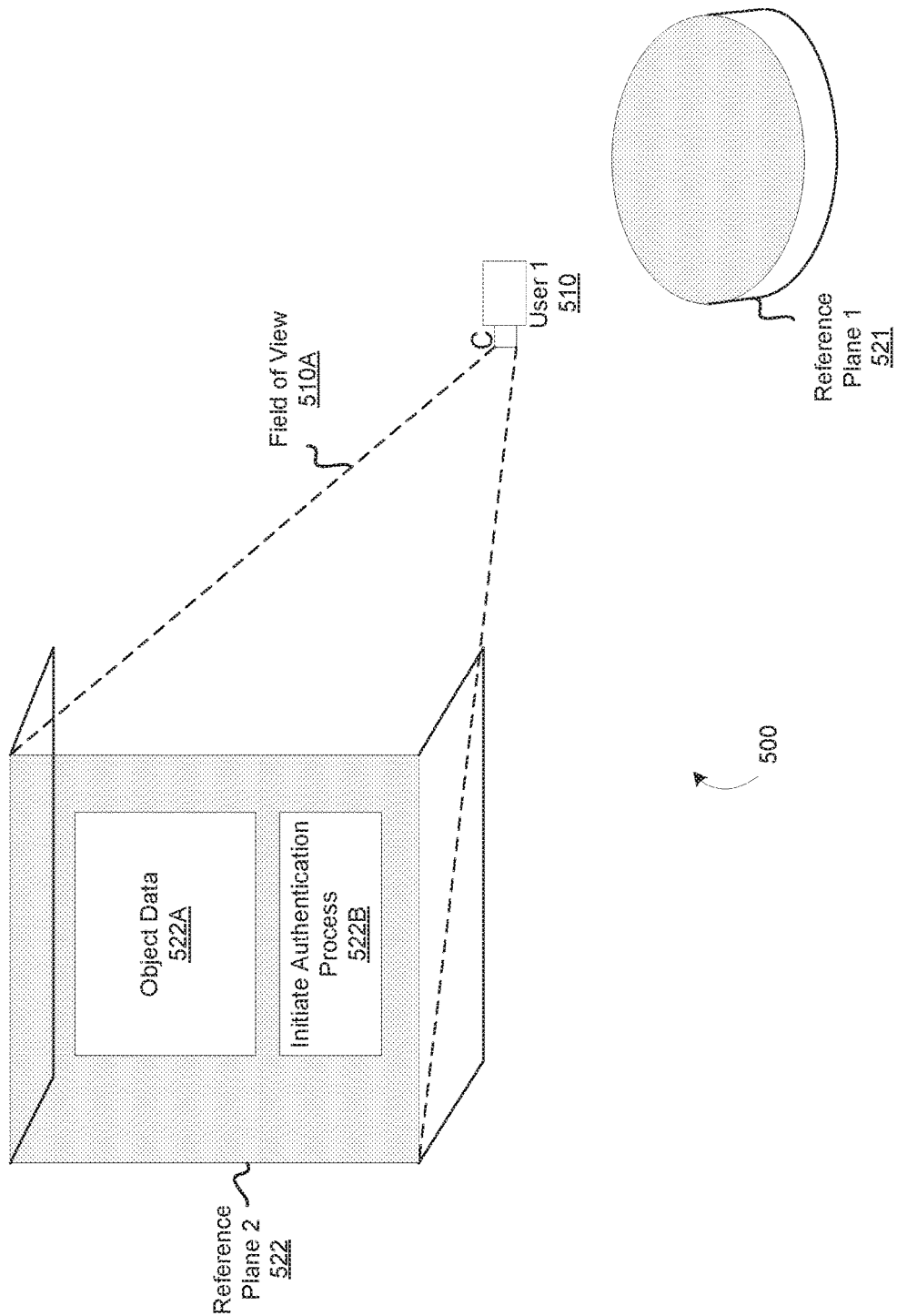
FIG. 5 shows an illustration of a private authentication environment according to an embodiment.

FIG. 5 shows an illustration of a private authentication environment according to an embodiment. As previously explained, the private authentication environment may allow a user to authenticate him or herself in a secure manner. Furthermore, the private authentication environment may prevent the authentication process from disturbing or being disturbed by other users in virtual reality.

Private authentication environment 500 may comprise user-1 510. In one embodiment, user-1 510 may be user-1 410 of FIG. 4. User-1 510 may be associated with a field of view 510A. Private authentication environment 500 may further comprise one or more reference planes such as reference plane-1 521 and reference plane 2 522. In embodiments, user-1 510 may view reference plane-2 522 from reference plane-1 521, such that reference plane-2 522 is within field of view 510A. Reference plane-2 522 may display data viewable by user-1 510, such as object data 522A and initiate authentication process 522B.

Object data 522A may be data for objects selected in a multi-user VR environment, such as multi-user VR environment 400 of FIG. 4. Object data 522A may be transmitted from a server hosting the multi-user VR environment, and the VR device can transmit the object data 522A to an authentication server hosting the private authentication environment. Transmission of object data 522A to the private authentication environment may be facilitated by communications between a vr experience application and authentication application stored on the VR device (e.g. VR experience application 114A and authentication application 114B of FIG. 1.) The object data 522A can further comprise new object data that may be unique to private authentication environment 500. For example, the object data 522A may comprise data for objects that are inaccessible to a user in multi-user VR environment 400, such as objects relating to an authentication process, biometric verification, and/or instructions thereof. Initiate authentication process 522B may be a selection to initiate an authentication process involving biometric verification. The biometric verification may be part of an authentication program that user-1 510 is enrolled in, per the registration process described in FIG. 2. In embodiments, user-1 510 may use an I/O device of the VR device to select initiate authentication process 522B and initiate an authentication process as further described below

V. Authentication Process Flow

FIGS. 6A-6D show a process flow diagram for authenticating a user in virtual reality. The process may be carried out using a VR device 610. In one embodiment, VR device 610 may be VR device 110 of FIG. 1. The process may further involve a multi-user VR environment and a private authentication environment, which may be the environments of FIG. 4 and FIG. 5 respectively.

Figure 6A:
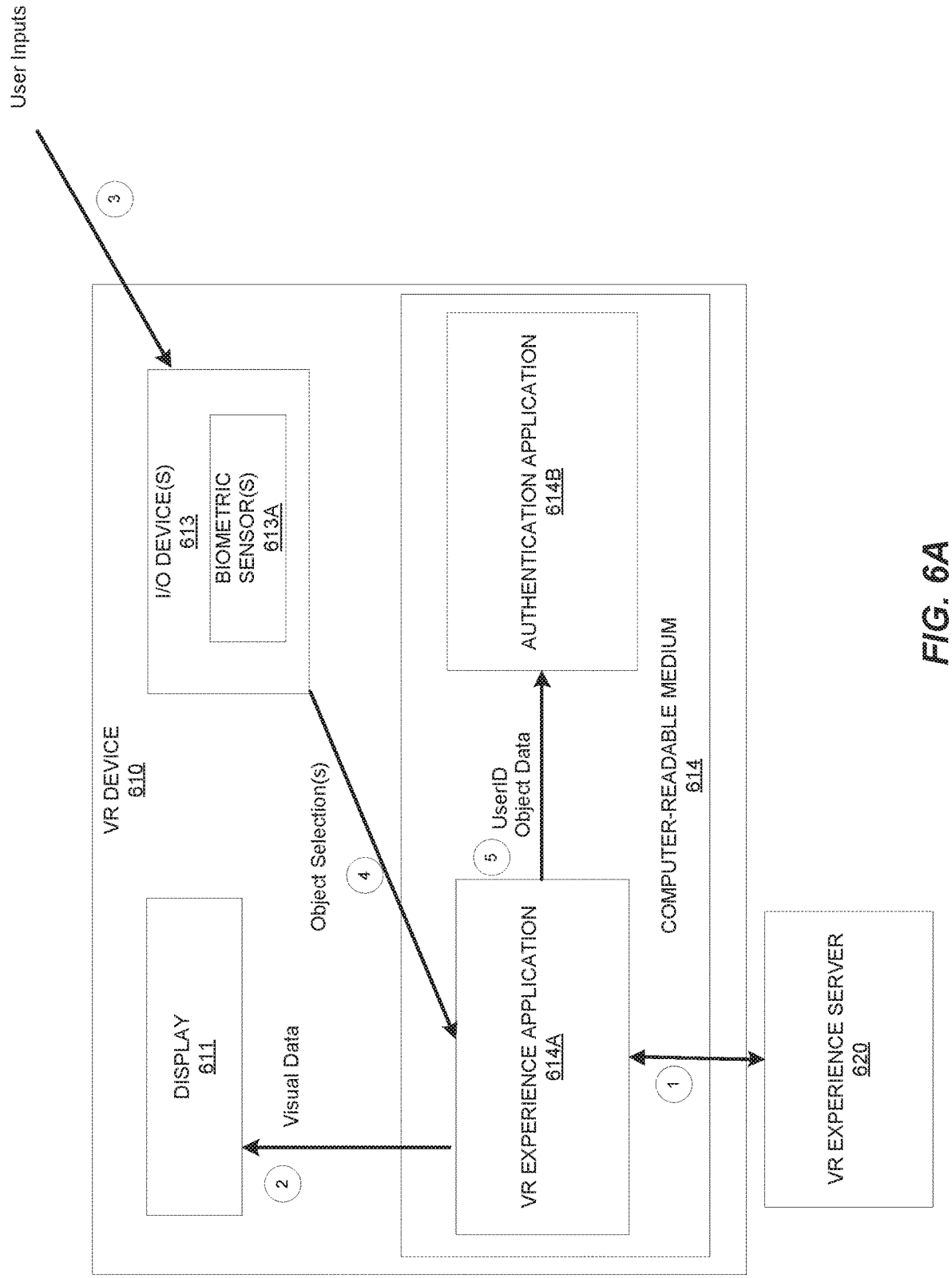
FIG. 6A, FIG. 6B, FIG. 6C, and FIG. 6D show a process flow diagram for authenticating a user in virtual reality.

Referring to FIG. 6A, at step 1, a first VR environment is launched on the VR device 610. In one embodiment, the first VR environment may be a multi-user VR environment and may involve other VR devices in addition to VR device 610, which may also be in communication with the VR experience server 620. Although reference is made to a multi-user VR environment, a similar flow can be used for a single-user VR environment.

The multi-user VR environment may be provided by VR experience application 614A in conjunction with VR experience server 620. The user may load the multi-user VR environment by accessing the VR experience application 614A from his or her VR device 610, and the VR experience application may establish a connection with VR experience server 620. The VR experience application 614A may store or have access to a registered user identifier for a VR authentication program as previously described above. Upon launching the multi-user VR environment, one or more input/output devices, I.O device(s) 613 of VR device 610 may be coupled to VR experience application 614A, such that user inputs, such as motions of the user and/or spoken inputs of the user may be received by VR experience application 614A. User inputs may alter the multi-user VR environment for the user and/or other users in the multi-user VR environment, such that the VR environment may better simulate a real environment. For example, user head movements may alter visual data to simulate surveying an environment. As another example, user voice inputs may be heard by other users nearby in the multi-user VR environment to simulate a shared environment.

At step 2, visual data for the multi-user VR environment is displayed to the user. The visual data can be displayed on display 611 of VR device 610. The visual data displayed may change depending on a portion of an environment space that is within the user's field of view (e.g. as in the case environment 400 of FIG. 4). The user may survey the multi-user VR environment, which may comprise one or more selectable objects. For example, the objects can be objects in a gaming experience comprising a plurality of users in a multi-user VR environment As another example, the objects can be virtual representations of products that can be purchased online and ordered through the environment. Other examples can include virtual business meetings, classrooms, etc., where a user may need to access private data during the meeting or class.

At step 3, the VR device 610 receives inputs from the user in the multi-user VR environment. The inputs may include selections of objects displayed in the VR environment to the user. The inputs may be received by the VR device through I/O device(s) 613. For example, the user may use one or more push buttons and/or speak one or more voice commands that can be interpreted by VR device 610. As other examples, the user can perform motions capable of being sensed by I/O, such as in the case where the I/O device(s) 613 comprise a camera and/or accelerator.

At step 4, object selections are communicated to VR experience application 614A. For example, I/O device may interpret inputs made by the user into commands, which can be generated as commands to a processor of VR device. The command may include a selection of an object that may initiate the launch of a private authentication environment. An electrical signal may be sent to a processor from I/O device(s) 613, and the processor may interpret the electrical signal based on instructions (code) of VR experience application 614A. The instructions may include launching an authentication application 614B, and transferring data from VR experience application 614 to the authentication application 614B. For example, instructional metadata may be assigned to an object, such that when the object is selected a programmed function may be executed. The executable function can include a trigger the launch of an authentication application 614B on the VR device 610 as well as other tasks such as passing specific object data from the VR experience application 614A to the authentication application 614B.

In one embodiment, launch of the authentication application 614B may be achieved through a sequence of functions that may be executed upon a sequence of actions. For example, a first function can be assigned to a doorway object that when selected by the user (e.g. the user motions towards, gazes at, or speaks a command to open the object) may cause the first function to execute. The first function may be a function to display a confirmation object, such as a object displaying a message such as "ready to checkout?" The user can then select the confirmation object (e.g. by performing a sensed motion, such as nodding his or head, which can be picked up by a gyroscope, accelerometer, camera, etc.), which may trigger a second function that launches the private authentication environment (e.g. 'launchVRauthentication( )' or 'privateauthentication.exe).

At step 5, object data from the VR experience application and a user identifier is retrieved by an authentication application. For example, the VR experience application 614A may comprise a plug-in of an authentication provider that may trigger the transfer of data to the authentication application 614B from the VR experience application 614A. Upon determining that a private authentication environment should be launched, the processor of VR device 610 may transmit a stored user identifier and object data from the VR experience application to authentication application 614B. These may be a user identifier and object data needed for carrying out an authentication process in the private authentication environment according to embodiments. In one embodiment, the VR experience application and authentication application may be different sub-modules of the same application.

Figure 6B:
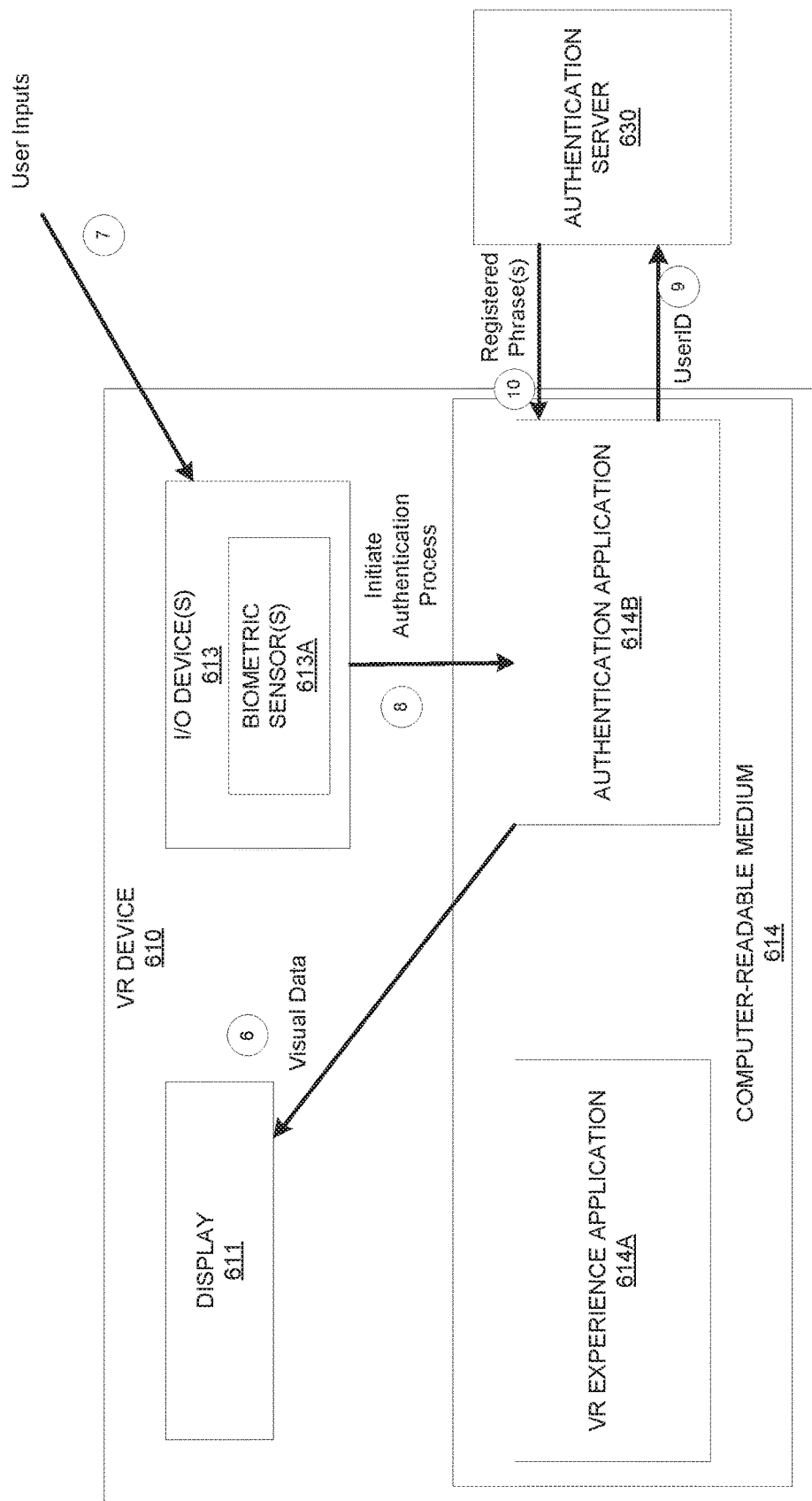

With reference to FIG. 6B, at step 6, visual data for a private authentication environment is displayed to the user. The private authentication environment may be provided by the authentication application 614B in conjunction with an authentication server 630. For example, authentication application 614B may comprise instructions for displaying objects to the user, and some of the object data may be provided by the authentication server 630. The private authentication environment may include new objects different from the objects displayed in the multi-user VR environment. For example, the private authentication environment may provide a viewable "digital information form" object, which may display object data for objects selected in the multi-user VR environment (e.g. items for purchase, price, etc.) as well as instructions for performing an authentication (e.g. "checkout" instructions).

At step 7, the VR device receives inputs from the user in the private authentication environment. The user may view the objects in the private authentication environment and may wish to select the objects or submit inputs to modify object data. For example, the user may wish to adjust form information of a digital form object displayed to the user (e.g. remove an item selected for purchase, modify a quantity, change a shipping address, etc.). The user may also wish to submit an input to initiate an authentication process, as described herein. For example, the user may select a "begin test" object, "proceed to checkout" object, or "voice validation" object. The user may submit the inputs to the VR device 610 using I/O device(s) 613 (e.g. pressing a push button in conjunction with a displayed pointer, speaking a voice command, motioning a selection, etc.).

At step 8, the authentication application receives a command to initiate an authentication process. For example, the authentication application may receive the selection of the "checkout object" described in step 7. The authentication application may then begin the authentication process by communicating with authentications server 630. The processor of VR device 610 may receive the user input from I/O device 613, which may be interpreted to be a command to communicate data with an authentication process server 630 necessary for carrying out an authentication process, per instructions of authentication application 614B. This may include a user identifier for a registered authentication program. Thus, the VR device 610 may establish an authentication session with the authentication server 630.

At step 9, the user identifier is sent to the authentication server. The user identifier may be sent to the authentication server 630, such that the authentication server may query for registered account information/user information. This may include information relating to a registered biometric template of the user, such as the type of biometric registered (e.g. voice, fingerprint, face) as well as instructions for collecting a biometric sample from the user. For example, the user identifier may be associated with a registered phrase, which when spoken by the user can be used to generate a voice signature (i.e. biometric template). As such, a generated voice signature may be used to compare the user's biometric sample to the registered biometric template for authentication of the user.

At step 10, the VR device 620 receives instructions for the user to provide a biometric sample, e.g., a registered phrase may be received. The registered phrase may be received by the VR device 610 from authentication server 630. Using the user identifier received in step 9, authentication server 630 may determine the registered phrase of the user. For example, the authentication server 630 may query a database and may determine a phrase linked to the user identifier in a relational table or look-up table.

Figure 6C:
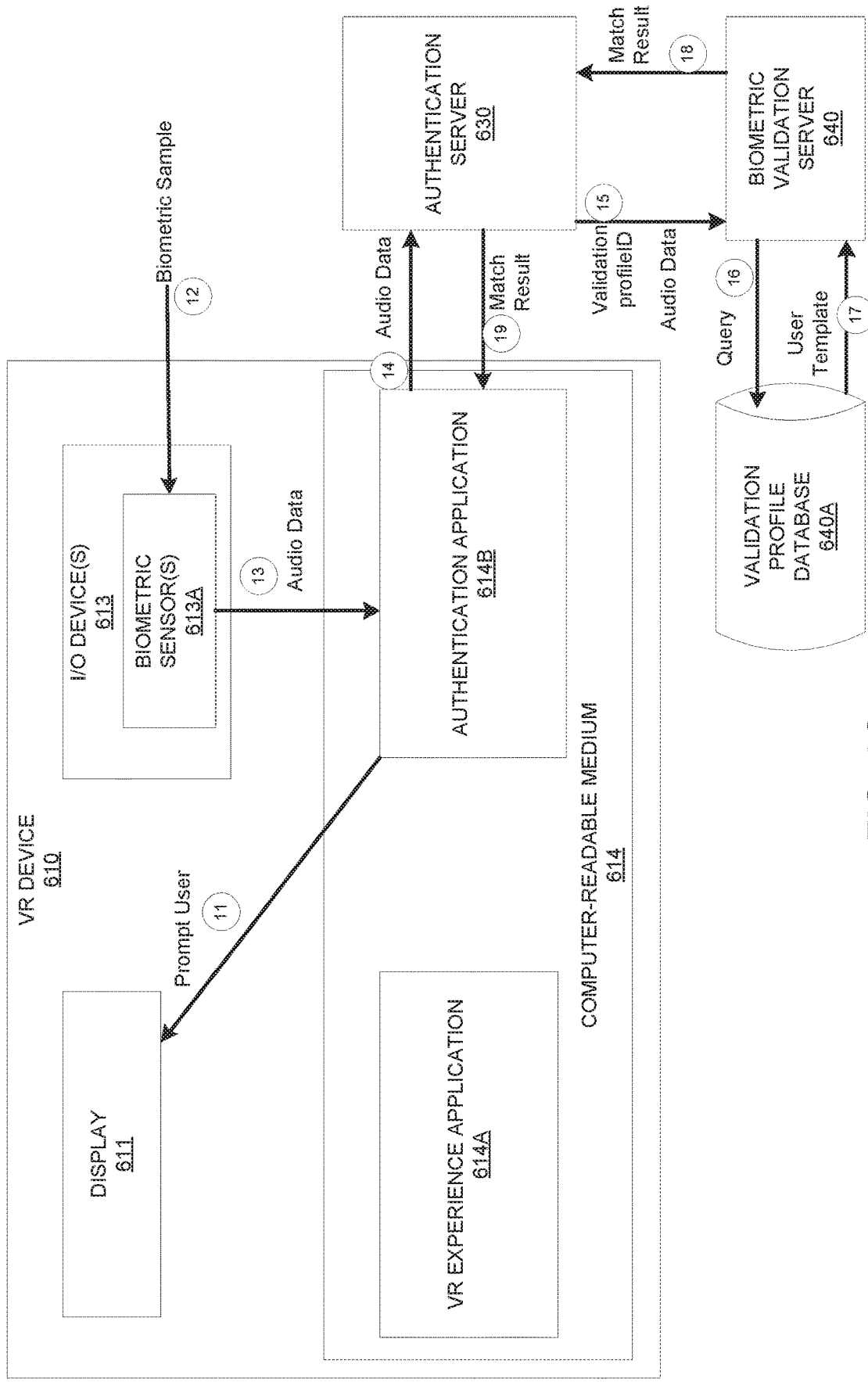

With reference to FIG. 6C, at step 11, the user is prompted to present his or her biometric sample. The instructions for presenting his or her biometric sample may be displayed to the user by displaying the instructions as visual data to the user on display 611. The biometric sample that the user is prompted to present may be of the same biometric sample presented during registration into the biometric template, such that a new biometric template can be generated and compared to the registered template for authentication. In one embodiment, the biometric sample may be a signature of the user's voice, and the user may be prompted to speak a registered phrase, as determined by the authentication server. For example, the user may be prompted say, "you can get in without a password," or some other phrase that was spoken during registration and from which a voice signature may be obtained (i.e. from which a biometric template of the user can be generated). The user may be prompted to present the biometric sample using a biometric sensor 613A of the VR device, such as a retinal scanner, fingerprint reader, iris scanner, or microphone from which the necessary biometric sample of the particular type registered can be obtained. For example, the user may be prompted to press a "record button" which may enable a recording feature of a microphone for recording a sample of the user speaking the registered phrase.

At step 12, a biometric sample is received from the user. The user may present his or her biometric sample according to instructions displayed to the user. For example, the user may be shown instructions in the private authentication environment to speak the registered phrase. The authentication application may further comprise code for terminating sensing of the biometric sample after a predetermined duration of time has passed. For example, the authentication application may comprise code for terminating recording by a microphone after 7 seconds has passed and then proceeding to saving of the audio file.

At step 13, the biometric sample data is received by the authentication application. In one embodiment, the biometric sample data may be audio data, such as a recorded audio file (e.g. in. wav or some other suitable format). The audio data may be saved by the authentication application in a local memory of the VR device 610, such as in computer-readable medium 614.

At step 14, the stored biometric sample data is transmitted to the authentication server. For example, the recorded audio file may be sent to the authentication server so that it can be compared to the registered voice signature of the user. This may include forwarding the recorded audio file to a biometric validation server 640, which may be a server separate from authentication server 630 or, in some embodiments, may be the same server.

At step 15, a validation profile identifier and the biometric sample data is sent to a biometric validation server. The validation profile identifier may be an identifier for a biometric validation profile/account that was established during the registration process. The validation profile identifier may be determined by the authentication server 630. For example, authentication server 630 may query a database for a validation profile ID linked to the user identifier of the user. The authentication server may then send the validation profile ID and the biometric sample data to the biometric validation server 640 so that the biometric sample data can be compared to a registered biometric template linked to the validation profile ID. For example, the authentication server 630 may send the validation profile ID and the recorded audio file in an authentication request message, query request message, or some other suitable data message.

At step 16, the biometric validation server queries a validation profile database based on the validation profile identifier. As previously explained, the user may have registered a biometric template during a registration process. During the registration process, the biometric template may have been linked to the validation profile identifier in a database accessible by the biometric validation server 640, such as validation profile database 640A.

At step 17, a registered biometric template of the user is retrieved by the biometric validation server 640. The biometric validation server 640 may query for the registered biometric template, and may retrieve it for comparison to the recorded biometric sample data. For example, the registered biometric template may be a voice signature file comprising unique features of the user's voice (e.g. the user's intonation, speed, and pronunciation of characters) that was generated/extracted from a previous recording of the user speaking the registered phrase.

At step 18, a match result is determined by the biometric validation server 640 and is sent to the authentication server.

The biometric validation server 640 may generate a second biometric template from the recorded biometric sample data and compare the second biometric template to the registered biometric template to determine a match. For example, biometric validation server 640 may generate a second voice signature file from the audio file recorded by the VR device 610, and may compare the second voice signature file to the voice signature file from registration.

In one embodiment, the biometric validation server 640 may determine a positive match result if the second biometric template and registered biometric template match above a pre-determined threshold. For example, the biometric validation server 640 may determine a confidence level or match score, and may determine that the user should be authenticated if the confidence level is 'High Confidence' (e.g. above 90% confidence). The positive match result can be indicated by a positive indicator, which can be included in a data message. In another embodiment, if the match result is below the pre-determined threshold but above a second threshold, additional authentication steps may be performed. For example, if the determined confidence level is below 90% but is above 70% (i.e. 'Normal confidence), then a second factor authentication process may be initiated. For example, a 4 digit verification code or other secret verification instruction (e.g. a specific body movement, a second phrase, a registered password, security question, etc.) may be sent to the user's registered email address, so that the user may then present the 4 digit verification to authentication server 630 to prove that they are in fact the owner of the registered email, and thus provide an additional layer of authentication. The specific body movement may be tracked by sensors on the user or that image the user. In some embodiments, such body movement can be used instead of the biometric sample for authentication.

At step 19, the match result is sent to the VR device 610. The match result may be sent to VR device by authentication server 630. For example, the VR device 610 may receive a positive match result indicating that the user has been successfully authenticated. The match result/authentication result may further be recorded/stored as a digital record. In this manner, the user may gain access to private data and/or objects selected in the multi-user VR environment or real representations thereof. For example, an underlying transaction between the user and a merchant that sells items selected by the user may be processed (e.g. using payment credentials stored on the VR device 610 or stored by the authentication server 630). In one embodiment, the authentication server 630 may record the authentication result. In another embodiment, VR experience server 620 may record the authentication result. In yet another embodiment, a session identifier for the authentication may be sent from the authentication server 630 to the VR experience server 620.

Figure 6D:
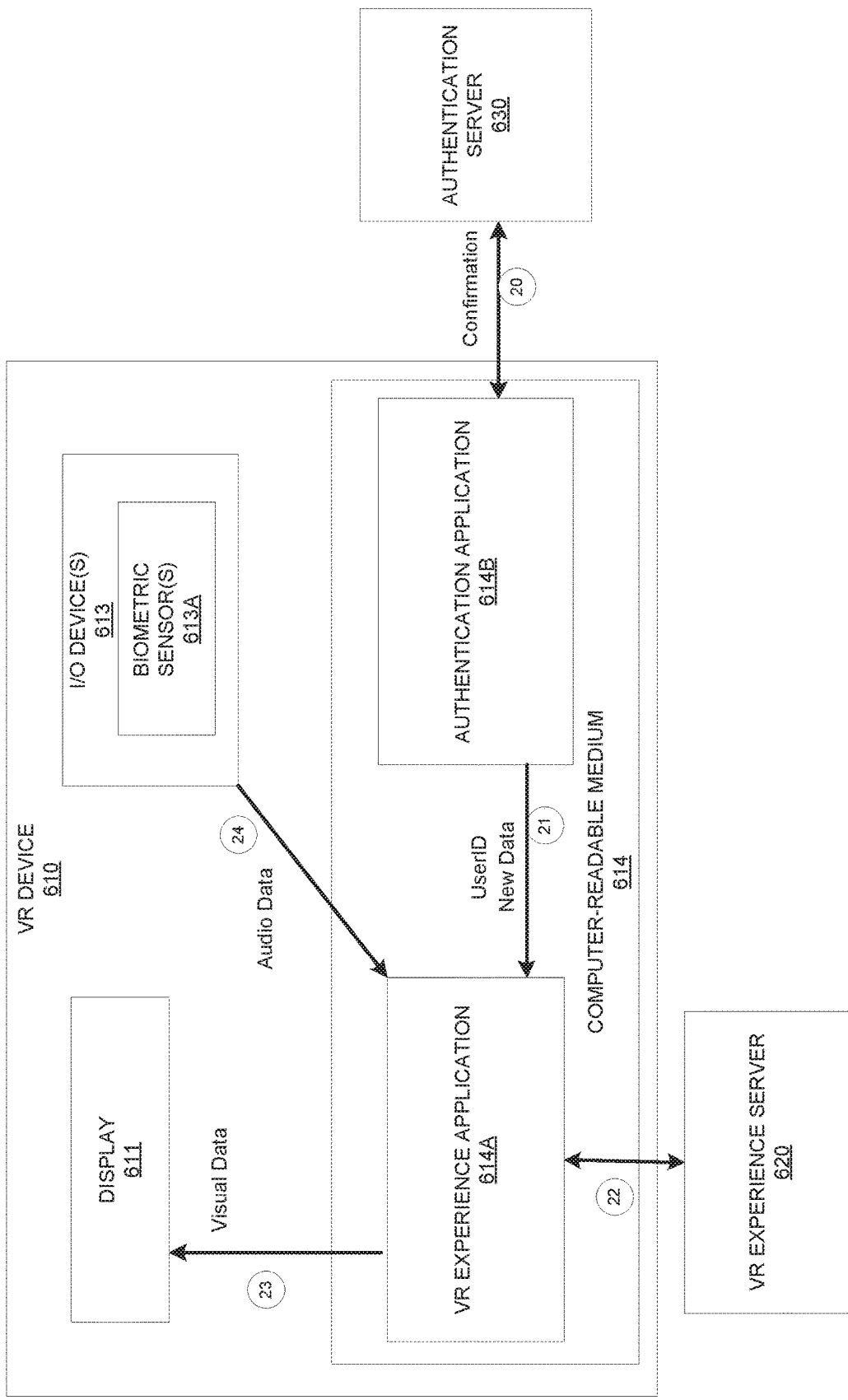

With reference to FIG. 6D, at step 20, the authentication result is confirmed. For example, a confirmation message may be displayed to the user by authentication application 614B as a selectable object, which the user may view and select to confirm with the authentication server 630. In one embodiment, the confirmation may comprise performing the second factor authentication process previously described. For example, the user may access his or her email address or text messages for a confirmation code. The user may then speak or enter the code in the private authentication environment, such that it may be transmitted from the authentication application 614B to the authentication server 630 to provide the additional layer of authentication and verification of the user.

At step 21, the user identifier and new data is sent back to the VR experience application. After the authentication result has been recorded, the VR device may proceed to closing out the private authentication environment. As such, the authentication session with the authentication server 630 may be terminated and data from the authentication session may be transmitted to the VR experience application 614A. This may include the user identifier and any new data that was generated in the private authentication environment. For example, the new data may include data relating to the match result (e.g. match or no match, number of attempts, type of biometric, time and location of user during authentication, etc.), data for a transaction authorization, or new object data. The new object data can include modifications of object data for objects in the multi-user VR environment or data for new objects that can be displayed in the multi-user VR environment, such as an object that confirms the authentication process (e.g. an entry pass object signifying granted access to a room in the multi-user VR environment, or a currency object signifying successful purchase of selected objects in the multi-user VR environment).

At step 22, the multi-user VR environment is re-entered to execute in the foreground of the VR device, e.g., to control audio and video for the VR device. In various embodiments, the VR experience application may be running in the background while the authentication application is executing or the VR experience application may exit completely, thereby requiring an entirely new lauch of VR experience application 614A. The VR experience application 614 may receive the user identifier and new data from step 21 and may then communicate with the VR experience server 620 to re-establish the multi-user VR environment. This may include communicating the new data to the VR experience server 620, and receiving audio and visual data from the VR experience server 620. For example, the VR experience application 614A may send the VR experience server 620 data relating to the authentication session (e.g. the match result, a transaction identifier, session ID, authorization code, selected object data, etc.). The VR experience server 620 may further send the VR experience application 614A data from other users in the multi-user VR environment, such as data generated at the other users' VR devices. In addition, the VR experience server 620 may send object data for objects that required authentication of the user to access. For example, the VR experience server may send purchased media content or object data for a virtual exam that can now be displayed to the user upon a positive authentication result.

As another example, object data may be sent from the VR experience server to the VR experience application prior to authentication as a locked object. For example, the object data can be encrypted using a shared encryption key between VR experience server and the VR device. Upon successful authentication of the user, the VR device 610 may then unlock the locked object by decrypting the object data. For example, VR experience application 614A may be configured to derive or regenerate the shared encryption key (e.g. using a Diffie-Hellman key exchange or other suitable secret sharing scheme) and decrypt selected object data upon receiving the positive authentication result. In yet another example, the private data can be encrypted payment credentials stored on the device. A positive authentication result received by the VR experience application may then initiate the VR device to retrieve the encrypted payment credentials, decrypt the encrypted payment credentials, and send the decrypted payment credentials to the VR experience server to conduct a transaction.

At step 23, visual data for the multi-user VR environment is displayed to the user. Visual data for the multi-user VR environment be displayed to the user on display 611. This may include object data, such as object data for objects selected by the user or object data for new objects in the multi-user VR environment.

At step 24, audio data from the user of the VR device is then able to be transmitted within the multi-user VR environment. Once the multi-user VR environment has been successfully launched and the authentication session fully terminated, VR experience application 614A may receive audio data generated from user inputs to the I/O device(s) 613. The audio data may further be transmitted to VR experience server 620. As such, the user's voice may then be audible in the multi-user VR environment.

VI. Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems in a computer system may be interconnected via a system bus. Additional subsystems can include a printer, keyboard, storage device(s), monitor, which is coupled to a display adapter, and others. Peripherals and input/output (I/O) devices, which couple to an I/O controller, can be connected to the computer system by any number of means known in the art such as an input/output (I/O) port (e.g., USB, FireWire®). For example, the I/O port or external interface (e.g. Ethernet, Wi-Fi, etc.) can be used to connect the computer system to a wide area network such as the Internet, a mouse input device, or a scanner. An interconnection via system bus can allow the central processor to communicate with each subsystem and to control the execution of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java. C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed:

1. A method comprising:
   launching, by a virtual reality device, a first virtual reality environment provided by a virtual reality application executing on the virtual reality device, the virtual reality application comprising a user identifier for a first user of the virtual reality device, wherein the virtual reality application communicates with a first environment server that provides a plurality of first objects to the virtual reality application;
   displaying, by the virtual reality device, the plurality of first objects, wherein at least one of the plurality of first objects is selectable by the first user;
   receiving, by the virtual reality device, a selection of a first object of the plurality of first objects in the first virtual reality environment by the first user using one or more input devices coupled to the virtual reality application, the first object associated with object data;
   in response to a communication from the first environment server as a result of the selection of the first object, launching, by the virtual reality device, an authentication application that provides a private authentication environment received from an authentication server, and wherein the private authentication environment is a second virtual reality environment that is separate from the first virtual reality environment and includes one or more second objects,
   wherein the launching the application that provides the private authentication environment comprises:
      sending the user identifier and the object data to the authentication application;
      decoupling the one or more input devices from the virtual reality application; and
      coupling the one or more input devices to the authentication application;
   retrieving, by the authentication application, information relating to a registered biometric template of the first user, the retrieving using the user identifier;
   prompting, by the virtual reality device, the first user to provide a biometric sample using the one or more input devices based on the information relating to the registered biometric template of the first user;
   receiving, by the virtual reality device, the biometric sample from the first user via the one or more input devices;
   sending, by the virtual reality device, the biometric sample to the authentication server to determine an authentication result for accessing private data; and
   receiving, by the virtual reality device, the authentication result.

2. The method of claim 1, wherein the communication from the first environment server includes the first object that is selected, wherein the first object includes instructional metadata, and wherein the virtual reality application processes the instructional metadata in response to the selection of the first object.

3. The method of claim 2, wherein the instructional metadata comprises an executable function, and wherein the executable function includes sending data to the authentication application.

4. The method of claim 3, wherein the executable function initiates the launching of the private authentication environment provided by the authentication application.

5. The method of claim 3, wherein the executable function initiates a display of a second object of the plurality of first objects, and wherein selecting the second object includes instructional metadata associated with a second executable function that initiates the launching of the private authentication environment provided by the authentication application.

6. The method of claim 1, wherein the first virtual reality environment comprises other users of other virtual reality devices, and wherein data generated by the first user using the one or more input devices is sent to the other virtual reality devices when the one or more input devices is coupled to the virtual reality application.

7. The method of claim 6, wherein the registered biometric template of the first user comprises audio data of a voice of the first user.

8. The method of claim 1, wherein accessing the private data comprises:
   retrieving encrypted private data from a memory of the virtual reality device;
   deriving an encryption key; and
   decrypting the encrypted private data using the encryption key.

9. The method of claim 8, further comprising:
   sending the private data to the first environment server to conduct a transaction.

10. The method of claim 1, wherein re-launching the first virtual reality environment comprises:
    sending the user identifier and new object data to the virtual reality application;
    decoupling the one or more input devices from the authentication application; and
    coupling the one or more input devices to the virtual reality application.

11. The method of claim 1, wherein the registered biometric template is linked to a validation profile identifier during a registration process, and wherein the authentication result is determined by:
    receiving the biometric sample from the virtual reality device;
    generating a second biometric template from the received biometric sample;
    determining the validation profile identifier based on the user identifier of the first user;
    querying a database for the registered biometric template linked to the validation profile identifier; and
    comparing the registered biometric template to the second biometric template;
    determining a match score based on the comparing; and
    generating the authentication result based on the match score.

12. The method of claim 11, wherein the authentication server determines the authentication result, and wherein generating the authentication result based on the match score comprises:
    determining the match score is above a first threshold;
    generating a positive indicator to indicate a successful match; and
    including the positive indicator in the authentication result.

13. The method of claim 11, wherein generating the authentication result based on the match score comprises:
    determining the match score is below a first threshold;
    determining the match score is above a second threshold;
    determining user information associated with the user identifier;

sending a confirmation code based on the user information;
receiving the confirmation code;
generating a positive indicator to indicate a successful match; and
including the positive indicator in the authentication result.

14. The method of claim 1, further comprising:
receiving a unique session identifier from the authentication server; and
sending the unique session identifier to the first environment server.

15. A system comprising:
a non-transitory computer readable medium storing instructions; and
one or more processors configured to execute the instructions stored on the computer readable medium to perform:
  launching, by a virtual reality device, a first virtual reality environment provided by a virtual reality application executing on the virtual reality device, the virtual reality application comprising a user identifier for a first user of the virtual reality device, wherein the virtual reality application communicates with a first environment server that provides a plurality of first objects to the virtual reality application;
  displaying, by the virtual reality device, the plurality of first objects, wherein at least one of the plurality of first objects is selectable by the first user;
  receiving, by the virtual reality device, a selection of a first object of the plurality of first objects in the first virtual reality environment by the first user using one or more input devices coupled to the virtual reality application, the first object associated with object data;
in response to a communication from the first environment server as a result of the selection of the first object, launching, by the virtual reality device, an authentication application that provides a private authentication environment received from an authentication server,
wherein the private authentication environment is a second virtual reality environment that is separate from the first virtual reality environment and includes one or more second objects,
wherein the launching the application that provides the private authentication environment comprises:
  sending the user identifier and the object data to the authentication application;
  decoupling the one or more input devices from the virtual reality application; and
  coupling the one or more input devices to the authentication application;
    retrieving, by the authentication application, information relating to a registered biometric template of the first user, the retrieving using the user identifier;
    prompting, by the virtual reality device, the first user to provide a biometric sample using the one or more input devices based on the information relating to the registered biometric template of the first user;
    receiving, by the virtual reality device, the biometric sample from the first user via the one or more input devices;
    sending, by the virtual reality device, the biometric sample to the authentication server to determine an authentication result for accessing private data; and
    receiving, by the virtual reality device, the authentication result.

16. The system of claim 15, wherein accessing the private data comprises:
retrieving encrypted private data from a memory of the virtual reality device;
deriving an encryption key; and
decrypting the encrypted private data using the encryption key.

17. The system of claim 15, wherein the registered biometric template is linked to a validation profile identifier during a registration process, and wherein the authentication result is determined by:
receiving the biometric sample from the virtual reality device;
generating a second biometric template from the received biometric sample;
determining the validation profile identifier based on the user identifier of the first user;
querying a database for the registered biometric template linked to the validation profile identifier; and
comparing the registered biometric template to the second biometric template;
determining a match score based on the comparing; and
generating the authentication result based on the match score.

* * * * *